(12) United States Patent
Bar-Zeev (10) Patent No.: US 11,363,378 B2
(45) Date of Patent: Jun. 14, 2022

(54) METHOD AND DEVICE FOR SOUND PROCESSING FOR A SYNTHESIZED REALITY SETTING

(71) Applicant: Apple Inc., Cupertino, CA (US)

(72) Inventor: Avi Bar-Zeev, Oakland, CA (US)

(73) Assignee: APPLE INC., Cupertino, CA (US)

(*) Notice: Subject to any disclaimer, the term of this patent is extended or adjusted under 35 U.S.C. 154(b) by 0 days.

(21) Appl. No.: 17/087,878

(22) Filed: Nov. 3, 2020

(65) Prior Publication Data

US 2021/0051406 A1 Feb. 18, 2021

Related U.S. Application Data

(63) Continuation of application No. PCT/US2019/028631, filed on Apr. 23, 2019.

(60) Provisional application No. 62/666,201, filed on May 3, 2018.

(51) Int. Cl.

| H03G 3/00 | (2006.01) |
| H04R 3/04 | (2006.01) |
| G02B 27/01 | (2006.01) |
| H04R 1/02 | (2006.01) |
| H04R 1/10 | (2006.01) |
| G06T 19/00 | (2011.01) |

(52) U.S. Cl.
CPC ........... *H04R 3/04* (2013.01); *G02B 27/0172* (2013.01); *H04R 1/028* (2013.01); *H04R 1/10* (2013.01); *G06T 19/006* (2013.01)

(58) Field of Classification Search
CPC . H04R 3/04; H04R 1/028; H04R 1/10; G02B 27/0172; G06T 19/006

USPC .................................................. 381/63, 61
See application file for complete search history.

(56) References Cited

U.S. PATENT DOCUMENTS

| 9,645,648 | B2 | 5/2017 | Spio |
| 2017/0068508 | A1 | 3/2017 | Cricri et al. |
| 2017/0332187 | A1 | 11/2017 | Lin et al. |
| 2018/0020312 | A1 | 1/2018 | Visser et al. |

(Continued)

FOREIGN PATENT DOCUMENTS

| GB | 2536020 A | * | 9/2016 | .............. G06F 3/011 |
| GB | 2536020 A |   | 9/2016 | |

OTHER PUBLICATIONS

PCT International Search Report and Written Opinion dated Sep. 5, 2019, PCT Application No. PCT/US2019/028631, pp. 1-9.

*Primary Examiner* — Ammar T Hamid
(74) *Attorney, Agent, or Firm* — Fernando & Partners, LLP (57) ABSTRACT

In one implementation, a method of transforming a sound into a virtual sound for a synthesized reality (SR) setting is performed by a head-mounted device (HMD) including one or more processors, non-transitory memory, a microphone, a speaker, and a display. The method includes displaying, on the display, an image representation of a synthesized reality (SR) setting including a plurality of surfaces associated with an acoustic reverberation property of the SR setting. The method includes recording, via the microphone, a real sound produced in a physical setting. The method further includes generating, using the one or more processors, a virtual sound by transforming the real sound based on the acoustic reverberation property of the SR setting. The method further includes playing, via the speaker, the virtual sound.

20 Claims, 7 Drawing Sheets

(56) References Cited

U.S. PATENT DOCUMENTS

2021/0160605 A1\* 5/2021 Igarashi .................. G01S 15/06

\* cited by examiner

METHOD AND DEVICE FOR SOUND PROCESSING FOR A SYNTHESIZED REALITY SETTING

CROSS-REFERENCE TO RELATED APPLICATIONS

This application is a continuation of Intl. Patent App. No. PCT/US2019/028631, filed on Apr. 23, 2019, which claims priority to U.S. Provisional Patent App. No. 62/666,201, filed on May 3, 2018, which are both hereby incorporated by reference in their entirety.

TECHNICAL FIELD

The present disclosure generally relates to sound processing for a synthesized reality setting, and in particular, to systems, methods, and devices for transforming a real sound into a virtual sound based on an acoustic reverberation property of a synthesized reality setting.

BACKGROUND

A physical setting refers to a world that individuals can sense and/or with which individuals can interact without assistance of electronic systems. Physical settings (e.g., a physical forest) include physical elements (e.g., physical trees, physical structures, and physical animals). Individuals can directly interact with and/or sense the physical setting, such as through touch, sight, smell, hearing, and taste.

In contrast, a synthesized reality (SR) setting refers to an entirely or partly computer-created setting that individuals can sense and/or with which individuals can interact via an electronic system. In SR, a subset of an individual's movements is monitored, and, responsive thereto, one or more attributes of one or more virtual objects in the SR setting is changed in a manner that conforms with one or more physical laws. For example, a SR system may detect an individual walking a few paces forward and, responsive thereto, adjust graphics and audio presented to the individual in a manner similar to how such scenery and sounds would change in a physical setting. Modifications to attribute(s) of virtual object(s) in a SR setting also may be made responsive to representations of movement (e.g., audio instructions).

An individual may interact with and/or sense a SR object using any one of his senses, including touch, smell, sight, taste, and sound. For example, an individual may interact with and/or sense aural objects that create a multi-dimensional (e.g., three dimensional) or spatial aural setting, and/or enable aural transparency. Multi-dimensional or spatial aural settings provide an individual with a perception of discrete aural sources in multi-dimensional space. Aural transparency selectively incorporates sounds from the physical setting, either with or without computer-created audio. In some SR settings, an individual may interact with and/or sense only aural objects.

One example of SR is virtual reality (VR). A VR setting refers to a simulated setting that is designed only to include computer-created sensory inputs for at least one of the senses. A VR setting includes multiple virtual objects with which an individual may interact and/or sense. An individual may interact and/or sense virtual objects in the VR setting through a simulation of a subset of the individual's actions within the computer-created setting, and/or through a simulation of the individual or his presence within the computer-created setting.

Another example of SR is mixed reality (MR). A MR setting refers to a simulated setting that is designed to integrate computer-created sensory inputs (e.g., virtual objects) with sensory inputs from the physical setting, or a representation thereof. On a reality spectrum, a mixed reality setting is between, and does not include, a VR setting at one end and an entirely physical setting at the other end.

In some MR settings, computer-created sensory inputs may adapt to changes in sensory inputs from the physical setting. Also, some electronic systems for presenting MR settings may monitor orientation and/or location with respect to the physical setting to enable interaction between virtual objects and real objects (which are physical elements from the physical setting or representations thereof). For example, a system may monitor movements so that a virtual plant appears stationary with respect to a physical building.

One example of mixed reality is augmented reality (AR). An AR setting refers to a simulated setting in which at least one virtual object is superimposed over a physical setting, or a representation thereof. For example, an electronic system may have an opaque display and at least one imaging sensor for capturing images or video of the physical setting, which are representations of the physical setting. The system combines the images or video with virtual objects, and displays the combination on the opaque display. An individual, using the system, views the physical setting indirectly via the images or video of the physical setting, and observes the virtual objects superimposed over the physical setting. When a system uses image sensor(s) to capture images of the physical setting, and presents the AR setting on the opaque display using those images, the displayed images are called a video pass-through. Alternatively, an electronic system for displaying an AR setting may have a transparent or semi-transparent display through which an individual may view the physical setting directly. The system may display virtual objects on the transparent or semi-transparent display, so that an individual, using the system, observes the virtual objects superimposed over the physical setting. In another example, a system may comprise a projection system that projects virtual objects into the physical setting. The virtual objects may be projected, for example, on a physical surface or as a holograph, so that an individual, using the system, observes the virtual objects superimposed over the physical setting.

An augmented reality setting also may refer to a simulated setting in which a representation of a physical setting is altered by computer-created sensory information. For example, a portion of a representation of a physical setting may be graphically altered (e.g., enlarged), such that the altered portion may still be representative of but not a faithfully-reproduced version of the originally captured image(s). As another example, in providing video pass-through, a system may alter at least one of the sensor images to impose a particular viewpoint different than the viewpoint captured by the image sensor(s). As an additional example, a representation of a physical setting may be altered by graphically obscuring or excluding portions thereof.

Another example of mixed reality is augmented virtuality (AV). An AV setting refers to a simulated setting in which a computer-created or virtual setting incorporates at least one sensory input from the physical setting. The sensory input(s) from the physical setting may be representations of at least one characteristic of the physical setting. For example, a virtual object may assume a color of a physical element captured by imaging sensor(s). In another example, a virtual object may exhibit characteristics consistent with actual weather conditions in the physical setting, as identified via imaging, weather-related sensors, and/or online weather data. In yet another example, an augmented reality forest may have virtual trees and structures, but the animals may have features that are accurately reproduced from images taken of physical animals.

Many electronic systems enable an individual to interact with and/or sense various SR settings. One example includes head mounted systems. A head mounted system may have an opaque display and speaker(s). Alternatively, a head mounted system may be designed to receive an external display (e.g., a smartphone). The head mounted system may have imaging sensor(s) and/or microphones for taking images/video and/or capturing audio of the physical setting, respectively. A head mounted system also may have a transparent or semi-transparent display. The transparent or semi-transparent display may incorporate a substrate through which light representative of images is directed to an individual's eyes. The display may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one embodiment, the transparent or semi-transparent display may transition selectively between an opaque state and a transparent or semi-transparent state. In another example, the electronic system may be a projection-based system. A projection-based system may use retinal projection to project images onto an individual's retina. Alternatively, a projection system also may project virtual objects into a physical setting (e.g., onto a physical surface or as a holograph). Other examples of SR systems include heads up displays, automotive windshields with the ability to display graphics, windows with the ability to display graphics, lenses with the ability to display graphics, headphones or earphones, speaker arrangements, input mechanisms (e.g., controllers having or not having haptic feedback), tablets, smartphones, and desktop or laptop computers.

When a user wearing an SR headset makes sound (e.g., speaks, whistles, claps, etc.), the SR headset can either ignore the sound (allowing the user to hear the sound naturally) or record the sound and play it through integrated speakers. In either case, properties of the sound may not be consistent with those expected in an SR setting presented by the SR headset. Accordingly, it may be desirable for the SR headset to process the sound such that it sounds as though it was produced in the presented SR setting.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for sound processing for an SR setting. In various implementations, the method is performed at a head-mounted device located in a physical setting and including one or more processors, non-transitory memory, a microphone, a speaker, and a display. The method includes displaying, on the display, an image representation of the SR setting including a plurality of surfaces associated with an acoustic reverberation property of the SR setting. The method includes recording, via the microphone, a real sound produced in the physical setting. The method further comprises generating, using the one or more processors, a virtual sound by transforming the real sound based on the acoustic reverberation property of the SR setting. The method further comprises playing, via the speaker, the virtual sound.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

As noted above, when a user wearing an SR headset makes sound (e.g., speaks, whistles, claps, stomps, etc.) or another sound is produced in the physical setting of the user, the SR headset can either ignore the sound (allowing the user to hear the sound naturally) or record the sound and play it through integrated speakers. However, because audio has been found to be an important aspect of a fully immersive experience, it may be desirable for the SR headset to process the sound such that it sounds as though it was produced in the presented ST setting. As an example, a user may be in a physical setting of his or her living room and an SR setting of a concert hall. Sound made in the user's living room (e.g., speech produced by the user or another person) is recorded and played back with echo to make it sound as though the user spoke in the (synthesized) concert hall.

Figure 1:
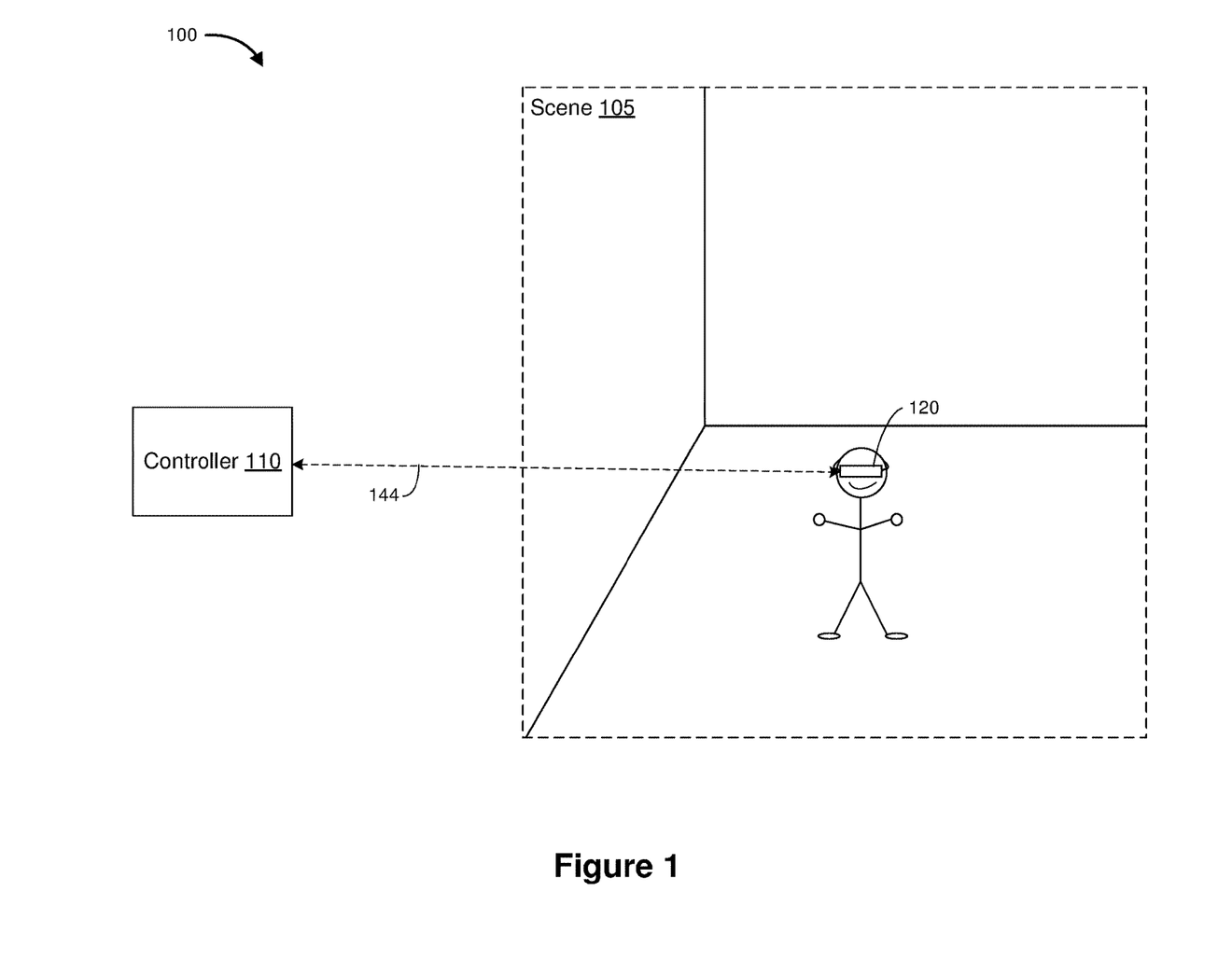
FIG. 1 is a block diagram of an example operating environment in accordance with some implementations.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and a head-mounted device (HMD) 120.

In some implementations, the controller 110 is configured to manage and coordinate a synthesized reality (SR) experience for a user. In some implementations, the controller 110 includes a suitable combination of software, firmware, and/or hardware. The controller 110 is described in greater detail below with respect to FIG. 2. In some implementations, the controller 110 is a computing device that is local or remote relative to the scene 105. For example, the controller 110 is a local server located within the scene 105. In another example, the controller 110 is a remote server located outside of the scene 105 (e.g., a cloud server, central server, etc.). In some implementations, the controller 110 is communicatively coupled with the HMD 120 via one or more wired or wireless communication channels 144 (e.g., BLUETOOTH, IEEE 802.11x, IEEE 802.16x, IEEE 802.3x, etc.).

In some implementations, the HMD 120 is configured to present the SR experience to the user. In some implementations, the HMD 120 includes a suitable combination of software, firmware, and/or hardware. The HMD 120 is described in greater detail below with respect to FIG. 3. In some implementations, the functionalities of the controller 110 are provided by and/or combined with the HMD 120.

According to some implementations, the HMD 120 presents a synthesized reality (SR) experience to the user while the user is virtually and/or physically present within the scene 105. In some implementations, while presenting an augmented reality (AR) experience, the HMD 120 is configured to present AR content. In some implementations, while presenting a virtual reality (VR) experience, the HMD 120 is configured to present VR content.

In some implementations, the user wears the HMD 120 on his/her head. As such, the HMD 120 includes one or more SR displays provided to display the SR content. For example, in various implementations, the HMD 120 encloses the field-of-view of the user. In some implementations, the HMD 120 is replaced with a handheld device (such as a smartphone or tablet) configured to present SR content in which the user does not wear the HMD 120, but holds the device with a display directed towards the field-of-view of the user and a camera directed towards the scene 105. In some implementations, the HMD 120 is replaced with an SR chamber, enclosure, or room configured to present SR content in which the user does not wear or hold the HMD 120.

Figure 2:
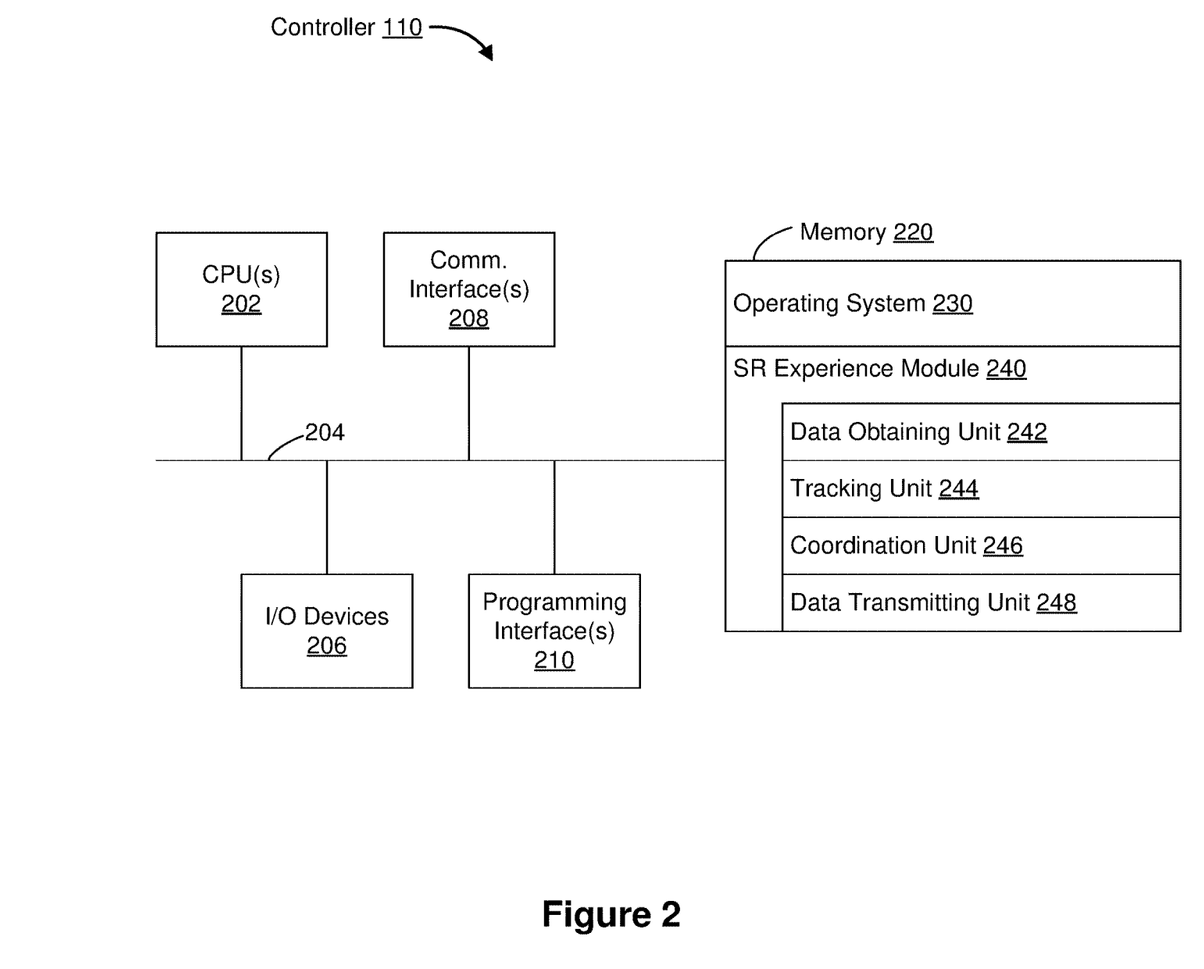
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and a synthesized reality (SR) experience module 240.

The operating system 230 includes procedures for handling various basic system services and for performing hardware dependent tasks. In some implementations, the SR experience module 240 is configured to manage and coordinate one or more SR experiences for one or more users (e.g., a single SR experience for one or more users, or multiple SR experiences for respective groups of one or more users). To that end, in various implementations, the SR experience module 240 includes a data obtaining unit 242, a tracking unit 244, a coordination unit 246, and a data transmitting unit 248.

In some implementations, the data obtaining unit 242 is configured to obtain data (e.g., presentation data, interaction data, sensor data, location data, etc.) from at least the HMD 120. To that end, in various implementations, the data obtaining unit 242 includes instructions and/or logic therefor, and heuristics and metadata therefor.

In some implementations, the tracking unit 244 is configured to map the scene 105 and to track the position/location of at least the HMD 120 with respect to the scene 105. To that end, in various implementations, the tracking unit 244 includes instructions and/or logic therefor, and heuristics and metadata therefor.

In some implementations, the coordination unit 246 is configured to manage and coordinate the SR experience presented to the user by the HMD 120. To that end, in various implementations, the coordination unit 246 includes instructions and/or logic therefor, and heuristics and metadata therefor.

In some implementations, the data transmitting unit 248 is configured to transmit data (e.g., presentation data, location data, etc.) to at least the HMD 120. To that end, in various implementations, the data transmitting unit 248 includes instructions and/or logic therefor, and heuristics and metadata therefor.

Although the data obtaining unit 242, the tracking unit 244, the coordination unit 246, and the data transmitting unit 248 are shown as residing on a single device (e.g., the controller 110), it should be understood that in other implementations, any combination of the data obtaining unit 242, the tracking unit 244, the coordination unit 246, and the data transmitting unit 248 may be located in separate computing devices.

Moreover, FIG. 2 is intended more as functional description of the various features which be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
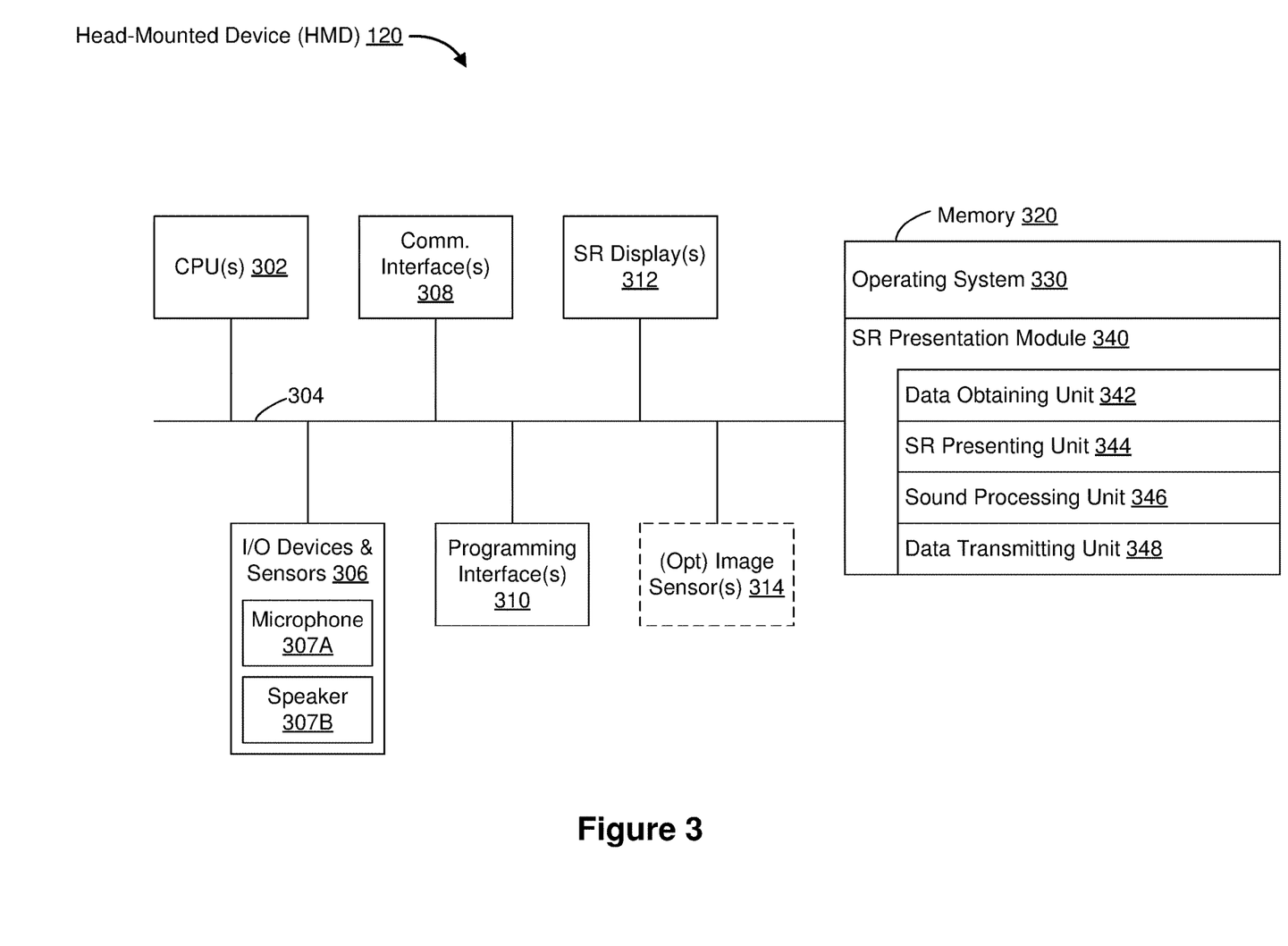
FIG. 3 is a block diagram of an example head-mounted device (HMD) in accordance with some implementations.

FIG. 3 is a block diagram of an example of the head-mounted device (HMD) 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the HMD 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more SR displays 312, one or more optional interior and/or exterior facing image sensors 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones 307A, one or more speakers 307B, a haptics engine, one or more depth sensors (e.g., a structured light, a time-of-flight, or the like), and/or the like.

In some implementations, the one or more SR displays 312 are configured to present the SR experience to the user. In some implementations, the one or more SR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more SR displays 312 correspond to diffractive, reflective, polarized, holographic, etc. waveguide displays. For example, the HMD 120 includes a single SR display. In another example, the HMD 120 includes an SR display for each eye of the user. In some implementations, the one or more SR displays 312 are capable of presenting AR and VR content. In some implementations, the one or more SR displays 312 are capable of presenting AR or VR content.

In some implementations, the one or more optional image sensors 314 are configured to obtain image data that corresponds to at least a portion of the face of the user that includes the eyes of the user. For example, the one or more optional image sensors 314 correspond to one or more RGB camera (e.g., with a complimentary metal-oxide-semiconductor (CMOS) image sensor or a charge-coupled device (CCD) image sensor), infrared (IR) camera, event-based camera, and/or the like.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and an SR presentation module 340.

The operating system 330 includes procedures for handling various basic system services and for performing hardware dependent tasks. In some implementations, the SR presentation module 340 is configured to present SR content to the user via the one or more SR displays 312. To that end, in various implementations, the SR presentation module 340 includes a data obtaining unit 342, an SR presenting unit 344, a sound processing unit 346, and a data transmitting unit 348.

In some implementations, the data obtaining unit 342 is configured to obtain data (e.g., presentation data, interaction data, sensor data, location data, etc.) from at least the controller 110. To that end, in various implementations, the data obtaining unit 342 includes instructions and/or logic therefor, and heuristics and metadata therefor.

In some implementations, the SR presenting unit 344 is configured to present SR content via the one or more SR displays 312. To that end, in various implementations, the SR presenting unit 344 includes instructions and/or logic therefor, and heuristics and metadata therefor.

In some implementations, the sound processing unit 346 is configured to generate a virtual sound by transforming a real sound based on an acoustic reverberation property of an SR setting. To that end, in various implementations, the sound processing unit 346 includes instructions and/or logic therefor, and heuristics and metadata therefor.

In some implementations, the data transmitting unit 348 is configured to transmit data (e.g., presentation data, location data, etc.) to at least the controller 110. To that end, in various implementations, the data transmitting unit 348 includes instructions and/or logic therefor, and heuristics and metadata therefor.

Although the data obtaining unit 342, the SR presenting unit 344, the sound processing unit 346, and the data transmitting unit 348 are shown as residing on a single device (e.g., the HMD 120), it should be understood that in other implementations, any combination of the data obtaining unit 342, the SR presenting unit 344, the sound processing unit 346, and the data transmitting unit 348 may be located in separate computing devices.

Moreover, FIG. 3 is intended more as functional description of the various features which be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4:
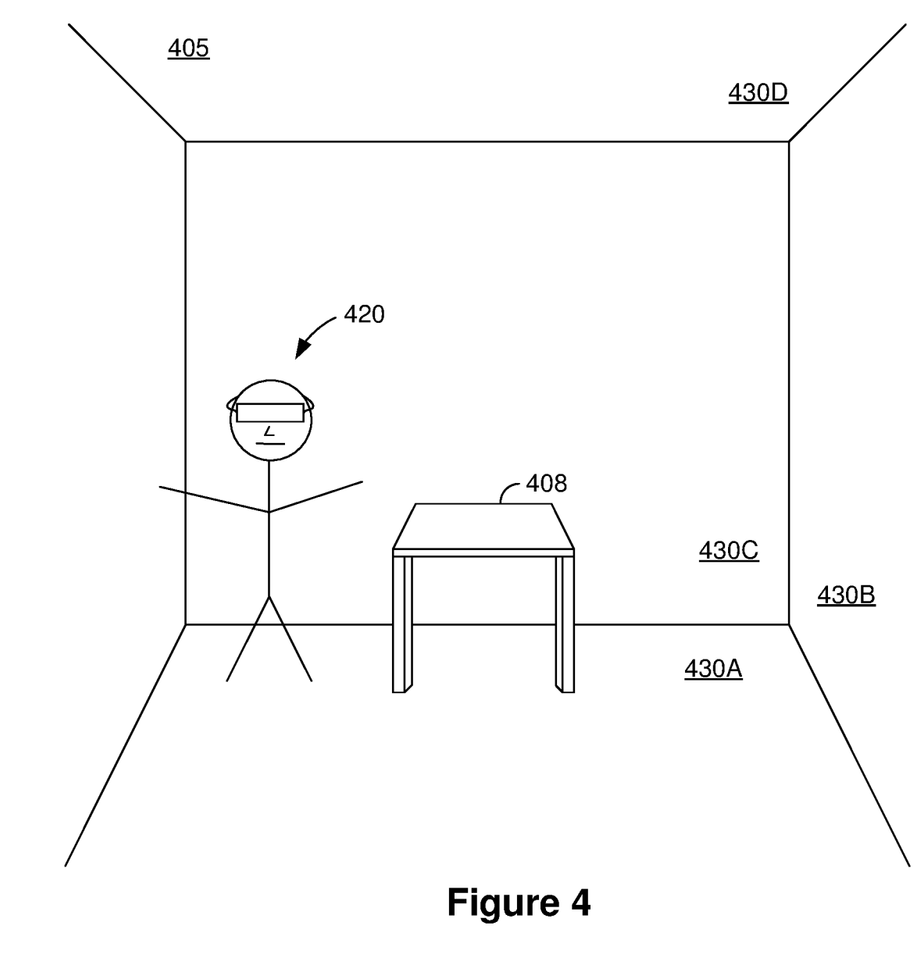
FIG. 4 illustrates an example physical setting in accordance with some implementations.

FIG. 4 illustrates an example physical setting 405 in accordance with some implementations. The physical setting 405 includes a first user (not shown, but from whose point-of-view the physical setting is illustrated), a second user 420, and a table 408. The physical setting 405 includes a plurality of surfaces 430A-430D including a floor surface 430A, two wall surfaces 430B-430C, and a ceiling surface 430D.

When a sound is produced in the physical setting 405, the sound travels to the ear of the first user along a number of paths, potentially reflecting off the surfaces 430A-430D. Accordingly, the physical setting 405 introduces an amount of reverb to the produced sound.

Figure 5:
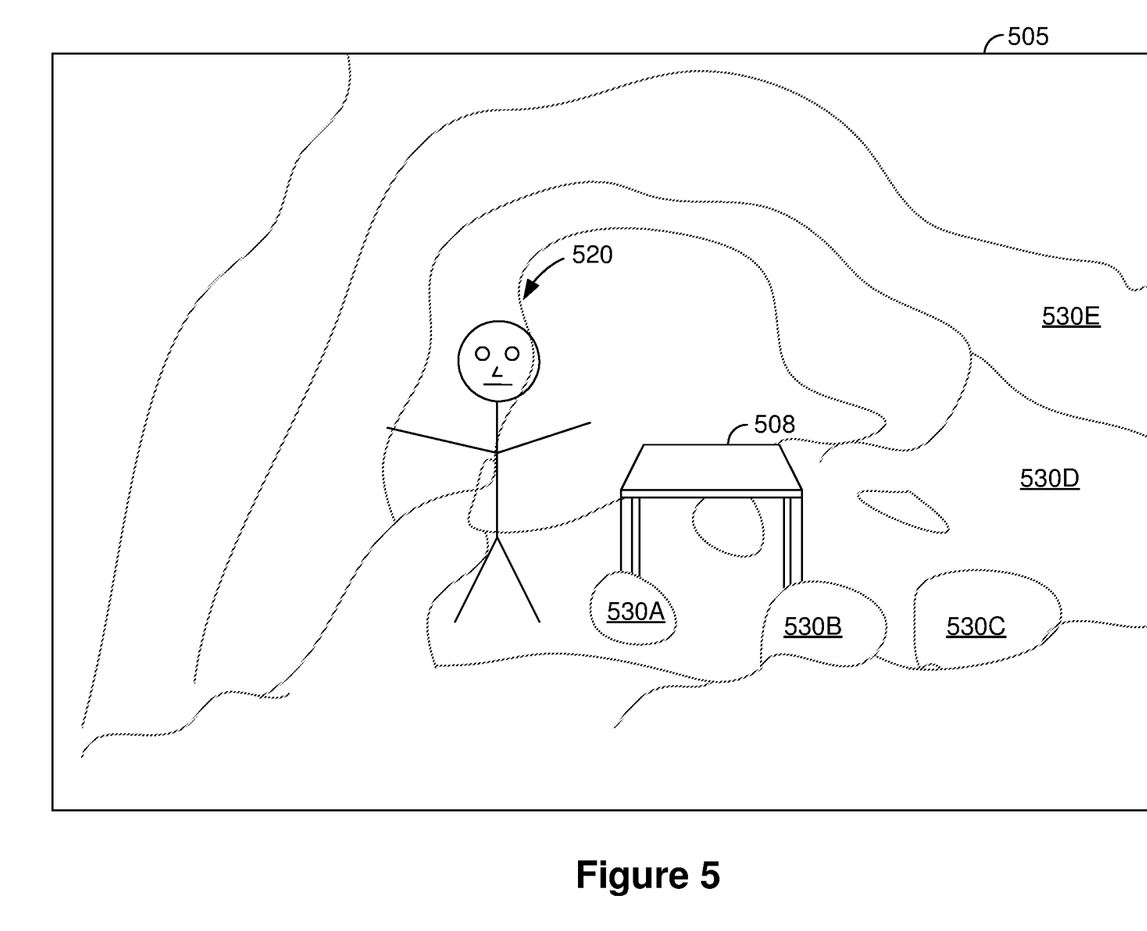
FIG. 5 illustrates an example image representation of a first SR setting in accordance with some implementations.

FIG. 5 illustrates an example image representation of a first SR setting 505 (e.g., a cave environment), experienced by a user who is physically located in the physical setting 405 of FIG. 4, in accordance with some implementations. The image representation of the first SR setting 505 includes an image representation of the second user 520, an image representation of the table 508, and image representations of various virtual objects (e.g., rocks and walls). The first SR setting 505 includes a first plurality of surfaces respectively located in the first SR setting 505 at a first plurality of locations. Accordingly, the image representation of the first SR setting 505 includes image representations of the first plurality of surfaces 530A-530E at the first plurality of locations, including three rock surfaces 530A-530C, a cave wall surface 530D, and a cave ceiling surface 530E.

When a sound is produced in the physical setting 405, the physical setting 405 introduces an amount of reverb. However, this amount of reverb may be inconsistent with the amount of reverb that would be introduced by a real version of the first SR setting 505 (e.g., a cave). In particular, it may be expected that a cave would introduce a large amount of reverb, particularly as compared to the amount of reverb in a small indoor room. Accordingly, in various implementations, in order to produce a more immersive experience, the HMD records the real sound produced in the physical setting, generates a virtual sound by transforming the real sound to change (e.g., increase) the amount of reverb associated with the real sound, and plays the virtual sound to the first user. Put another way, as the first user speaks, his HMD picks up his voice, introduces reverberation consistent with what might be expected of the SR setting, and plays back his voice with the additional reverb in a speaker of the HMD (as well as the HMDs of other users who are participating in the same SR setting), thereby increasing the level of realism of the simulated reality experience.

Figure 6:
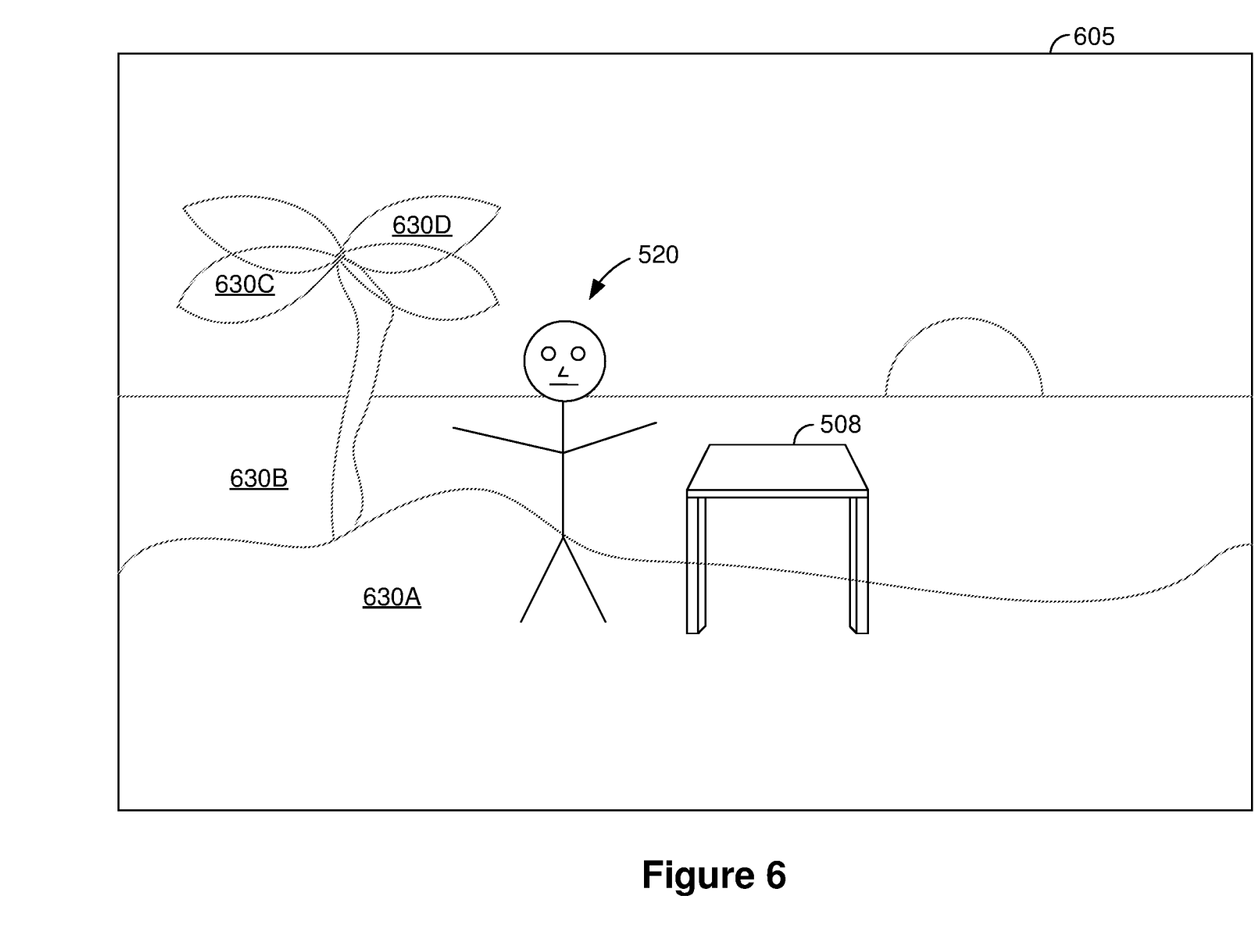
FIG. 6 illustrates an example image representation of a second SR setting in accordance with some implementations.

FIG. 6 illustrates an example image representation of a second SR setting 605 (e.g., a beach environment), experienced by a user who is physically located in the physical setting 405 of FIG. 4, in accordance with some implementations. The image representation of the second SR setting 605 includes an image representation of the second user 520, an image representation of the table 508, and image representations of various virtual objects (e.g., sand, water, and leaves). The second SR setting 605 includes a second plurality of surfaces respectively located in the second SR setting 605 at a plurality of second locations. Accordingly, the image representation of the second SR setting 605 includes image representations of the second plurality of surfaces 630A-630D at the second plurality of locations, including a sand floor surface 630A, an ocean water surface 630B, and two leaf surfaces 630C and 630D.

As noted above, when a sound is produced in the physical setting 405, the physical setting 405 introduces an amount of reverb. However, this amount of reverb may be inconsistent with the amount of reverb that would be introduced by a real version of the second SR setting 605. In particular, it may be expected that a beach would introduce little to no reverb, particularly as compared to the amount of reverb in a large room without acoustic dampening (e.g., a large living room with wood floor, a cave, etc.). Accordingly, in various implementations, in order to produce a more immersive experience, the HMD records the real sound produced in the physical setting 405, generates a virtual sound by transforming the real sound to change (e.g., decrease) the amount of reverb associated with the real sound, and plays the virtual sound to the first user.

In particular, it is to be appreciated that real versions of the first SR setting 505 and the second SR setting 605 would be expected to introduce different amounts of reverb. In determining the amount of reverb that would be expected to be introduced by a real version of an SR setting, properties of the plurality of surfaces can be used, such as their locations (e.g., relative to each other or the location of the user), acoustic dampening characteristics, or other properties.

Figure 7:
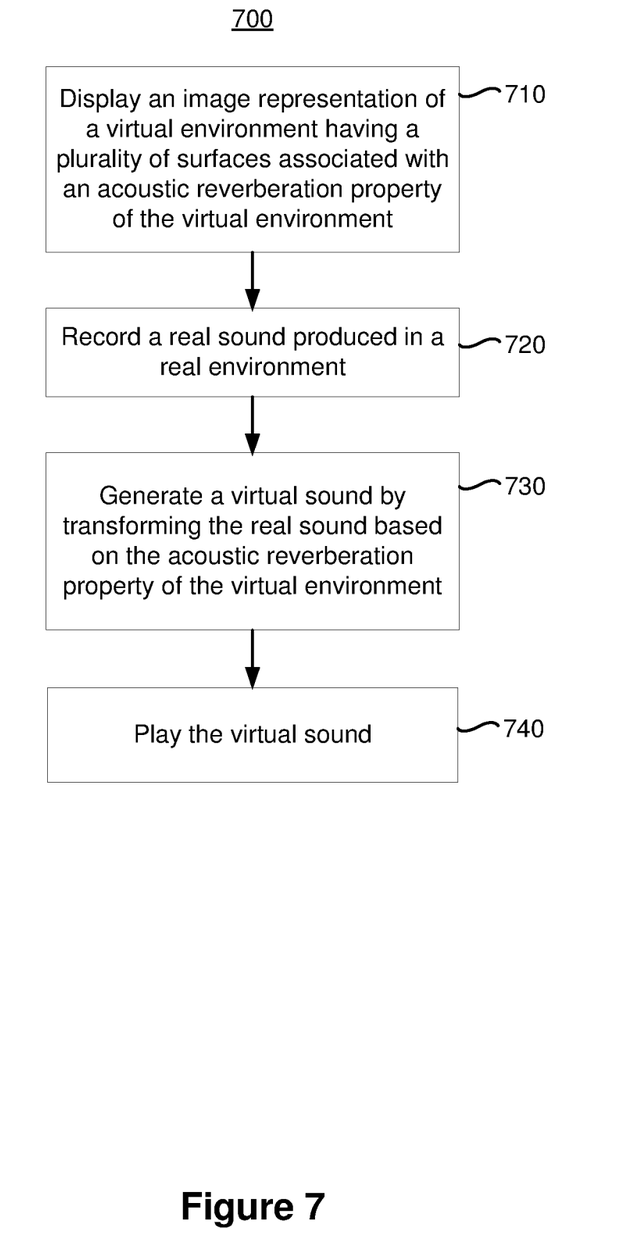
FIG. 7 is a flowchart representation of a method of transforming a sound based on an SR setting in accordance with some implementations.

FIG. 7 is a flowchart representation of a method 700 of transforming a sound based on an SR setting in accordance with some implementations. In various implementations, the method 700 is performed by a device with one or more processors, non-transitory memory, a microphone, a speaker, and one or more SR displays (e.g., the HMD 120 FIG. 3) located in a physical setting. In some implementations, the method 700 is performed by processing logic, including hardware, firmware, software, or a combination thereof. In some implementations, the method 700 is performed by a processor executing instructions (e.g., code) stored in a non-transitory computer-readable medium (e.g., a memory). Briefly, in some circumstances, the method 700 includes: recording a real sound produced in a physical setting, generating a virtual sound by transforming the real sound based on an acoustic reverberation property of a synthesized reality setting, and playing the virtual sound.

The method 700 begins, in block 710, with the device displaying, on the display, an image representation of an SR setting having a plurality of surfaces associated with an acoustic reverberation property of the SR setting. For example, FIG. 5 illustrates an image representation of a first SR setting 505 and FIG. 6 illustrates an image representation of a second SR setting 605.

In various implementations, the acoustic reverberation property of the SR setting indicates an amount of reverb (e.g., a volume or a duration) that would be expected to be introduced by a real version of the SR setting. In various implementations, the acoustic reverberation property indicates an impulse response function (or transfer function) of the SR setting.

In various implementations, the plurality of surfaces are respectively located in the SR setting at a plurality of locations. Accordingly, the image representation of the SR setting includes image representations of the surfaces at the plurality of locations. In various implementations, the plurality of locations define the acoustic reverberation property of the SR setting. For example, when the plurality of surfaces are distant from a virtual location of the user, the acoustic reverberation property indicates a larger amount of reverb and when the plurality of surfaces are close to the virtual location of the user, the acoustic reverberation property indicates a smaller amount of reverb. As another example, when the plurality of surfaces are oriented to face the virtual location of the user, the acoustic reverberation property indicates a larger amount of reverb and when the plurality of surfaces are not oriented to face the virtual location of the user, the acoustic reverberation property indicates a smaller amount of reverb.

In various implementations, the plurality of surfaces are respectively associated with a plurality of acoustic dampening characteristics. In various implementations, the plurality of acoustic dampening characteristics define the acoustic reverberation property of the SR setting. For example, when the plurality of acoustic dampening characteristics are high (e.g., indicating a high degree of acoustic dampening), the acoustic reverberation property indicates a lower amount of reverb and when the plurality of acoustic dampening characteristics are low (e.g., indicating a low degree of acoustic dampening), the acoustic reverberation property indicates a higher amount of reverb.

As an example, the first SR setting (of which an image representation 505 is shown in FIG. 5) includes a plurality of surfaces 530A-530E that are distantly located from the virtual location of the first user (because the cave is large), oriented to face the first user (because the walls and ceiling are curved and face many directions), and associated with low acoustic dampening characteristics (because rocks reflect a large percentage of sound). Accordingly, the acoustic reverberation property of the first SR setting indicates a large amount of reverb.

As another example, the second SR setting (of which an image representation 605 is shown in FIG. 6) includes a plurality of surfaces 630A-630D that are further distantly located from the virtual location of the first user (because the ocean is far away), not oriented to face the first user (because the sand and water are flat generally facing up), and associated with high acoustic dampening characteristics (because sand and leaves are acoustically absorptive). Accordingly, the acoustic reverberation property of the second SR setting indicates a small amount of reverb.

The method 700 continues, at block 720, with the device recording, via the microphone, a real sound produced in the physical setting. In various implementations, the real sound is produced by the first user (e.g., by speaking or clapping). In various implementations, the real sound is produced by the second user (e.g., by speaking or stomping). In various implementations, the real sound is produced by other noise sources in the physical setting (e.g., a stereo system). In various implementations, the device transforms the (as described below with respect to block 730) differently depending on the source of the sound.

The method 700 continues, at block 730, with the device generating a virtual sound by transforming the real sound based on the acoustic reverberation property of the SR setting. In particular, in various implementations, the device transforms the real sound so that it sounds as though it were produced in a real version of the SR setting.

In various implementations, the device transforms the real sound based on the acoustic reverberation property by changing (e.g., increasing or decreasing) an amount of reverb of the real sound. In various implementations, this includes determining an amount of reverb of the real sound, determining an amount of reverb for the virtual sound, and changing the amount of reverb of the real sound to match the determined amount of reverb for the virtual sound.

In various implementations, the plurality of surfaces are respectively located in the SR setting at a plurality of locations, and transforming the real sound based on the acoustic reverberation property includes changing an amount of reverb of the real sound based on the plurality of locations. For example, in various implementations, changing the amount of reverb includes changing the amount of reverb to a first amount when the plurality of locations are distant from a virtual location of a user, or changing the amount of reverb to a second amount, less than the first amount, when the plurality of locations are close to the virtual location of the user.

In various implementations, the plurality of surfaces are respectively associated with a plurality of acoustic dampening characteristics, and transforming the real sound based on the acoustic reverberation property includes changing an amount of reverb of the real sound based on the plurality of acoustic dampening characteristics. For example, in various implementations, changing the amount of reverb includes changing the amount of reverb to a first amount when the plurality of acoustic dampening characteristics are low, or changing the amount of reverb to a second amount, less than the first amount, when the plurality of acoustic dampening characteristics are high.

In various implementations, the device classifies the SR setting into one of a plurality of discrete classes based on the plurality of surfaces (e.g., their location, acoustic dampening characteristics, and/or other properties). For example, the plurality of discrete classes can include a large room (associated with a high amount of reverb), a small room (associated with a small amount of reverb), or an outdoor location (associated with a small amount of reverb). As another example, the plurality of discrete classes can include an enclosed space having a smaller volume (e.g., a living room with a low ceiling) and an enclosed space having a larger volume (e.g., the same living room with a vaulted ceiling).

In various implementations, the device determines a transfer function based on the plurality of surfaces (e.g., their location and/or acoustic dampening characteristics). For example, the device can apply a ray-tracing algorithm to determine the transfer function. Thus, in various implementations, the device transforms the real sound by applying the transfer function to the real sound. In various implementations, the device further equalizes the real sound to compensate for the transfer function of the physical setting (e.g., using MMSE (minimum mean-squared error) or zero-forcing).

In various implementations, in addition to transforming the real sound based on the acoustic reverberation property of the SR setting, the device generates the virtual sound by further transforming the real sound based on one or more other acoustic properties of the SR setting. In various implementations, the device filters the real sound. For example, the device lowpass filters the real sound because the SR setting is underwater or highpass filters the real sound because the SR setting is in space. In various implementations, the device adjusts the frequency of real sound. For example, the device increases the frequency of the real sound (e.g., the voice of the second user) because the SR setting is a room full of helium. As noted above, in various implementations, the device transforms the real sound differently depending on the source of the sound. Accordingly, the device may adjust the frequency of the voice of the second user, but not ambient sounds. In various implementations, the device adjusts the volume of the real sound. For example, the device increases the volume of the sound because the SR setting is a rock concert or decreases the volume of the sound because the SR setting is a library.

The method 700 continues, at block 740, with the device playing, via the speaker, the virtual sound. In various implementations, playing the virtual sound further includes noise-cancelling the real sound. Thus, the user hears only the processed sound, rather than both the processed sound and the real sound.

In various implementations, the method 700 repeats in a different SR setting with a different transformation based on a different acoustic reverberation property of the different SR setting. Accordingly, in various implementations, the method 700 further includes displaying (as described with respect to block 710), on the display, an image representation of a second SR setting having a plurality of surfaces associated with a second acoustic reverberation property of the second SR setting different than the acoustic reverberation property of the SR setting; recording (as described with respect to block 720), via the microphone, a second real sound generated in the physical setting; generating (as described with respect to block 730) a second virtual sound by transforming the second real sound based on the second acoustic reverberation property of the second SR setting; and playing (as described with respect to block 740), via the speaker, the second virtual sound.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a device located in a physical setting and including one or more processors, non-transitory memory, a microphone, a speaker, and a display:
   displaying, on the display, an image representation of a computer-generated setting associated with an acoustic reverberation property of the computer-generated setting;
   recording, via the microphone, a real sound produced in the physical setting;
   determining a corresponding acoustic reverberation property of the physical setting;
   generating, using the one or more processors, a virtual sound by transforming the real sound based on the acoustic reverberation property of the computer-generated setting and the corresponding acoustic reverberation property of the physical setting; and
   playing, via the speaker, the virtual sound.

2. The method of claim 1, wherein transforming the real sound includes changing an amount of reverb of the real sound.

3. The method of claim 2, wherein changing the amount of reverb of the real sound includes:
  determining an amount of reverb of the real sound;
  determining an amount of reverb for the virtual sound; and
  changing the amount of reverb of the real sound to match the determined amount of reverb for the virtual sound.

4. The method of claim 2, wherein the computer-generated setting includes a plurality of surfaces respectively located in the computer-generated setting at a plurality of locations and wherein changing the amount of reverb of the real sound is based on the plurality of locations.

5. The method of claim 4, wherein changing the amount of reverb includes changing the amount of reverb to a first amount when the plurality of locations are distant from a virtual location of a user or changing the amount of reverb to a second amount, less than the first amount, when the plurality of locations are close to the virtual location of the user.

6. The method of claim 2, wherein the computer-generated setting includes a plurality of surfaces respectively associated with a plurality of acoustic dampening characteristics and changing the amount of reverb of the real sound is based on the plurality of acoustic dampening characteristics.

7. The method of claim 6, wherein changing the amount of reverb includes changing the amount of reverb to a first amount when the plurality of acoustic dampening characteristics are low or changing the amount of reverb to a second amount, less than the first amount, when the plurality of acoustic dampening characteristics are high.

8. The method of claim 1, wherein transforming the real sound includes:
  determining a transfer function of the computer-generated setting;
  determining a transfer function of the physical setting; and
  transforming the real sound based on the transfer function of the computer-generated setting and the transfer function of the physical setting.

9. The method of claim 1, wherein playing the virtual sound further comprises noise-canceling the real sound.

10. The method of claim 1, wherein generating the virtual sound further comprises transforming the real sound based on one or more other acoustic properties of the computer-generated setting.

11. The method of claim 1, further comprising, after playing the virtual sound:
  displaying, on the display, an image representation of a second computer-generated setting associated with a second acoustic reverberation property of the second computer-generated setting different from the acoustic reverberation property of the computer-generated setting;
  recording, via the microphone, a second real sound generated in the physical setting;
  generating, using the one or more processors, a second virtual sound by transforming the second real sound based on the second acoustic reverberation property of the second computer-generated setting and the corresponding acoustic reverberation property of the physical setting; and
  playing, via the speaker, the second virtual sound.

12. A device located in a physical setting and comprising:
  a microphone;
  a speaker;
  a display; and
  one or more processors to:
    display, on the display, an image representation of a computer-generated setting associated with an acoustic reverberation property of the computer-generated setting;
    record, via the microphone, a real sound produced in the physical setting;
    determine a corresponding acoustic reverberation property of the physical setting;
    generate, using the one or more processors, a virtual sound by transforming the real sound based on the acoustic reverberation property of the computer-generated setting and the corresponding acoustic reverberation property of the physical setting; and
    play, via the speaker, the virtual sound.

13. The device of claim 12, wherein transforming the real sound includes changing an amount of reverb of the real sound.

14. The device of claim 13, wherein changing the amount of reverb of the real sound includes:
  determining an amount of reverb of the real sound;
  determining an amount of reverb for the virtual sound; and
  changing the amount of reverb of the real sound to match the determined amount of reverb for the virtual sound.

15. The device of claim 13, wherein the computer-generated setting includes a plurality of surfaces respectively located in the computer-generated setting at a plurality of locations and wherein changing the amount of reverb of the real sound is based on the plurality of locations.

16. The device of claim 15, wherein changing the amount of reverb includes changing the amount of reverb to a first amount when the plurality of locations are distant from a virtual location of a user or changing the amount of reverb to a second amount, less than the first amount, when the plurality of locations are close to the virtual location of the user.

17. The device of claim 13, wherein the computer-generated setting includes a plurality of surfaces respectively associated with a plurality of acoustic dampening characteristics and changing the amount of reverb of the real sound is based on the plurality of acoustic dampening characteristics.

18. The device of claim 17, wherein changing the amount of reverb includes changing the amount of reverb to a first amount when the plurality of acoustic dampening characteristics are low or changing the amount of reverb to a second amount, less than the first amount, when the plurality of acoustic dampening characteristics are high.

19. The device of claim 12, wherein transforming the real sound includes:
  determining a transfer function of the computer-generated setting;
  determining a transfer function of the physical setting; and
  transforming the real sound based on the transfer function of the computer-generated setting and the transfer function of the physical setting.

20. A non-transitory computer-readable medium having instructions encoded thereon which, when executed by one or more processors of a device located in a physical setting and including a microphone, a speaker, and a display, cause the device to:
  display, on the display, an image representation of a computer-generated setting associated with an acoustic reverberation property of the computer-generated setting;

record, via the microphone, a real sound produced in the physical setting;
determine a corresponding acoustic reverberation property of the physical setting;
generate, using the one or more processors, a virtual sound by transforming the real sound based on the acoustic reverberation property of the computer-generated setting and the corresponding acoustic reverberation property of the physical setting; and
play, via the speaker, the virtual sound.

* * * * *